United States Patent
Gregg et al.

(10) Patent No.: US 7,846,397 B2
(45) Date of Patent: Dec. 7, 2010

(54) WIRELESS TEMPERATURE SENSOR FOR OBTAINING TEMPERATURE PROFILES IN A MIXING VESSEL

(75) Inventors: Jack T. Gregg, Peoria, AZ (US); Soroush Amidi, Montreal (CA)

(73) Assignee: Honeywell International Inc., Morristown, NJ (US)

(*) Notice: Subject to any disclaimer, the term of this patent is extended or adjusted under 35 U.S.C. 154(b) by 579 days.

(21) Appl. No.: 11/973,534

(22) Filed: Oct. 9, 2007

(65) Prior Publication Data

US 2009/0092522 A1   Apr. 9, 2009

(51) Int. Cl.
*F01N 3/20* (2006.01)
*G08B 19/02* (2006.01)
*G01K 1/08* (2006.01)

(52) U.S. Cl. ............ 422/105; 422/108; 422/109; 422/119; 340/584; 340/588; 374/141; 374/E1.001

(58) Field of Classification Search .......... 422/105, 422/108, 109, 119; 340/588, 584; 374/141, 374/E1.001
See application file for complete search history.

(56) References Cited

U.S. PATENT DOCUMENTS

| | | | |
|---|---|---|---|
| 6,958,693 B2 * | 10/2005 | Rothgeb et al. | 340/539.22 |
| 2003/0204371 A1 | 10/2003 | Sciamanna | |
| 2003/0227394 A1 | 12/2003 | Rothgeb et al. | |
| 2004/0197239 A1 * | 10/2004 | Mirkovic et al. | 422/105 |
| 2007/0003450 A1 * | 1/2007 | Burdett et al. | 422/108 |

* cited by examiner

*Primary Examiner*—Walter D Griffin
*Assistant Examiner*—Lessanework Seifu
(74) *Attorney, Agent, or Firm*—Munck Carter, LLP

(57) ABSTRACT

A wireless temperature sensor for use in monitoring the temperature of a fluid or gas in a mixing vessel. The wireless temperature sensor comprises a temperature probe for contacting the fluid or gas and generating a signal based on the gas/fluid temperature; a temperature reader for receiving the signal generated by the temperature probe and determining therefrom a temperature reading of the fluid or gas; and a radio frequency (RF) transceiver for transmitting the temperature reading determined by the temperature reader to a control apparatus external to the mixing vessel.

20 Claims, 3 Drawing Sheets

WIRELESS TEMPERATURE SENSOR FOR OBTAINING TEMPERATURE PROFILES IN A MIXING VESSEL

TECHNICAL FIELD OF THE INVENTION

The present application relates generally to process control system and, more specifically, to a wireless temperature probe for measuring temperatures of a fluid or gas and wirelessly transmitting the measurements to a control system.

BACKGROUND OF THE INVENTION

Processing facilities are typically managed using process control systems. Among other functions, these control systems often regulate the temperature of materials, particularly fluids and/or gases, undergoing a catalytic process in a mixing vessel in the processing facilities. For example, the temperature may be controlled by measuring the temperature of a fluidized bed of catalyst and increasing or decreasing the flow rate(s) of material(s) into the mixing vessel in order to raise or lower the temperature. Exemplary processing facilities include manufacturing plants, chemical plants, oil refineries, and ore processing plants, among others.

Conventional process control systems typically measure the temperature of a fluid or gas in a mixing vessel by means of a temperature probe that contacts the gas or the surface of the fluid. Alternatively, the temperature probe may be placed in the wall of the mixing vessel and contact the outer perimeter of the gas or fluid. However, neither of these arrangements provides an accurate temperature profile in a process reactor that has a fluidized bed of catalyst. These types of processes are often exothermic or endothermic in nature and a substantial difference in temperature may exist between the center region of the catalytic material and the surface or outer perimeter of the gas or fluid. However, due to high temperatures and/or the corrosiveness of materials in the mixing vessel, it may not be practical to place a temperature probe in the interior region of the mixing vessel and run wiring to the control system on the exterior of the mixing vessel.

Therefore, there is a need in the art for improved apparatuses and methods for measuring the temperature of materials in a processing system. In particular, there is a need for a temperature probe that can measure temperatures in a fluidized bed of catalytic materials in the interior of a mixing vessel without requiring extensive wiring to communicate with a control system on the exterior of the mixing vessel.

SUMMARY OF THE INVENTION

To address the above-discussed deficiencies of the prior art, it is a primary object to provide a wireless temperature sensor for use in monitoring the temperature of a fluid or gas in a mixing vessel. The wireless temperature sensor comprises: 1) a temperature probe for contacting the fluid or gas and generating a signal according to the temperature of the fluid or gas; 2) a temperature reader for receiving the signal generated by the temperature probe and determining therefrom a temperature reading of the fluid or gas; and 3) a radio frequency (RF) transceiver for transmitting the temperature reading determined by the temperature reader to a control apparatus external to the mixing vessel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
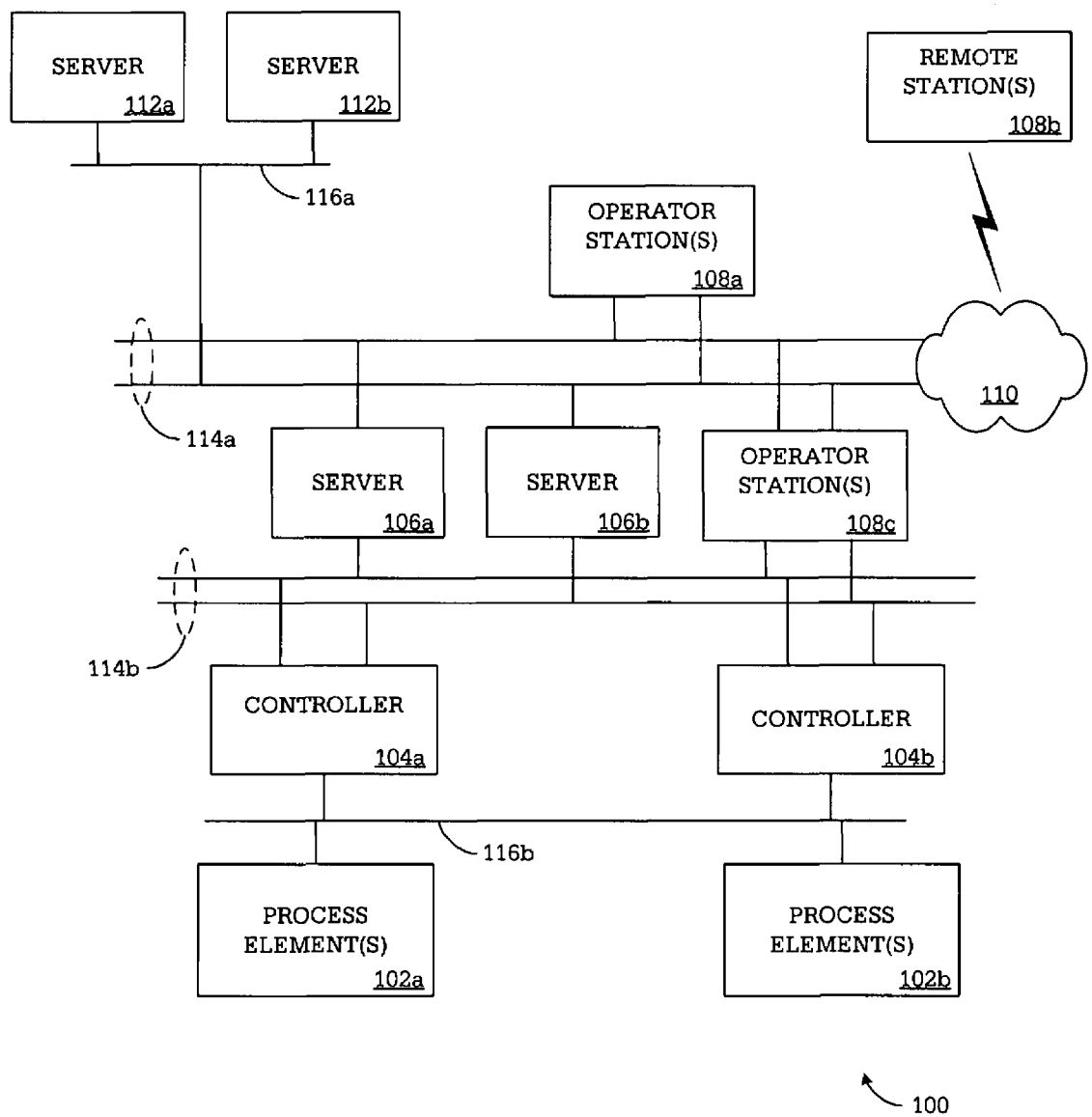
FIG. 1 illustrates an exemplary process control system according to one embodiment of this disclosure.
Figure 2:
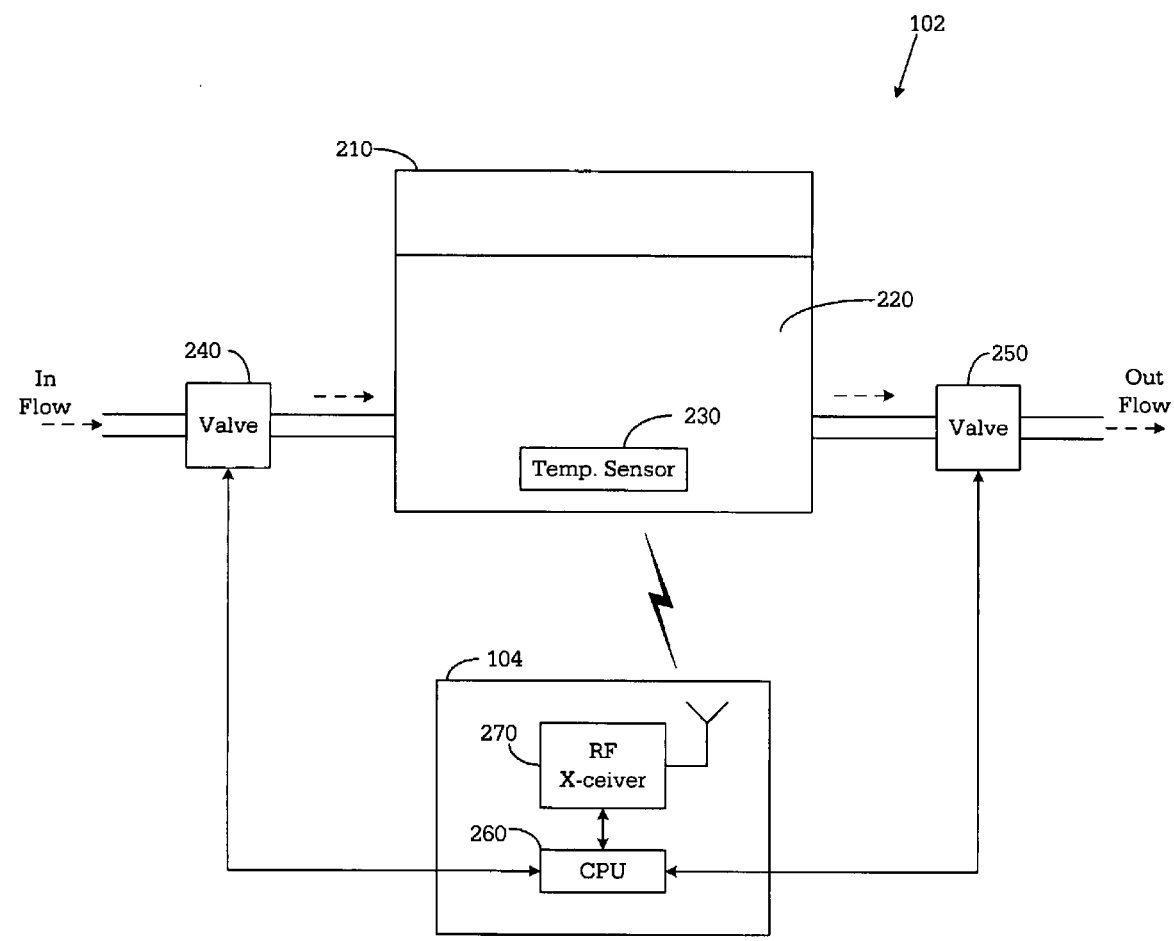
FIG. 2 illustrates an exemplary mixing vessel holding a fluid containing catalytic material and controlled by an external control system according to an exemplary embodiment of the disclosure.
Figure 3:
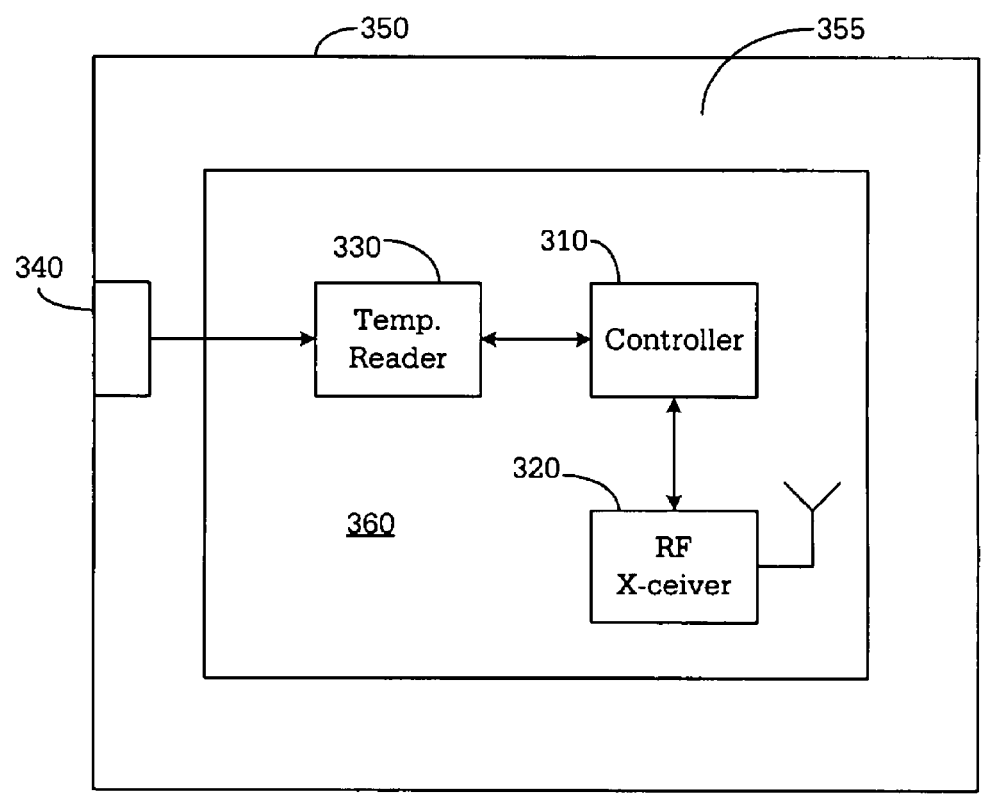
FIG. 3 illustrates a wireless temperature sensor for monitoring the temperature profile in the mixing vessel according to an exemplary embodiment of the disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged process control system.

FIG. 1 illustrates exemplary process control system 100 according to one embodiment of this disclosure. The embodiment of process control system 100 shown in FIG. 1 is for illustration only. Other embodiments of process control system 100 may be used without departing from the scope of this disclosure.

In this example embodiment, process control system 100 includes one or more process elements 102, including exemplary process elements 102a and 102b. Process elements 102a and 102b represent components in a process or production system that may perform any of a wide variety of functions. For example, process elements 102a and 102b may represent motors, catalytic crackers, valves, mixing vessels, or other industrial equipment in a production environment. Process elements 102a and 102b may represent any other or additional components in any suitable process or production system. Each of process elements 102a and 102b includes any hardware, software, firmware, or combination thereof for performing one or more functions in a process or production system. While only two process elements 102a and 102b are shown in this example, any number of process elements 102 may be included in a particular implementation of the process control system 100.

Two controllers 104a and 104b are coupled to process elements 102a and 102b. Controllers 104a and 104b control the operation of process elements 102a and 102b. For example, controllers 104a and 104b may monitor the operation of process elements 102a and 102b and provide control signals to process elements 102a and 102b. Each of controllers 104a and 104b includes any hardware, software, firmware, or combination thereof for controlling one or more of process elements 102a and 102b. In an advantageous embodiment, process elements 102a and 102b comprise mixing vessels containing wireless temperature sensors that are wirelessly monitored by controllers 104a and 104b in order to control a catalytic process occurring in the mixing vessels.

Two servers 106a and 106b are coupled to controllers 104a and 104b. Servers 106a and 106b perform various functions to support the operation and control of controllers 104a and 104b and process elements 102a and 102b. For example, servers 106a and 106b may log information collected or generated by controllers 104a and 104b, such as status information (i.e., temperature) related to the operation of process elements 102a and 102b. Servers 106a and 106b may also execute applications that control the operation of controllers 104a and 104b, thereby controlling the operation of process elements 102a and 102b. In addition, servers 106a and 106b may provide secure access to controllers 104a and 104b. Each of servers 106a and 106b includes any hardware, software, firmware, or combination thereof for providing access to or control of controllers 104a and 104b.

One or more operator stations 108a and 108b are coupled to servers 106a and 106b, and one or more operator stations 108c are coupled to controllers 104a and 104b. The operator stations 108a and 108b represent computing or communication devices providing user access to servers 106a and 106b, which may then provide user access to controllers 104a and 104b and process elements 102a and 102b. Operator stations 108c represent computing or communication devices providing user access to controllers 104a and 104b (without using resources of servers 106a and 106b). As particular examples, operator stations 108a-108c may allow users to review the operational history of process elements 102a and 102b using information collected by controllers 104a and 104b and/or servers 106a and 106b. Operator stations 108a-108c may also allow the users to adjust the operation of process elements 102a and 102b, controllers 104a and 104b, or servers 106a and 106b. Each one of operator stations 108a-108c includes any hardware, software, firmware, or combination thereof for supporting user access and control of system 100. Operator stations 108a-108c may, for example, represent personal computers.

In this example, at least one of operator stations 108b is remote from servers 106a and 106b. The remote station is coupled to servers 106a and 106b through network 110. Network 110 facilitates communication between the various components in system 100. For example, network 110 may communicate Internet Protocol (IP) packets, frame relay frames, Asynchronous Transfer Mode (ATM) cells, or other suitable information between network addresses. Network 110 may include one or more local area networks (LANs), metropolitan area networks (MANs), wide area networks (WANs), all or a portion of a global network such as the Internet, or any other communication system or systems at one or more locations.

In this example, system 100 also includes two additional servers 112a and 112b. Servers 112a and 112b execute various applications to control the overall operation of system 100. For example, system 100 may be used in a processing or production plant or other facility, and servers 112a and 112b may execute applications used to control the plant or other facility. As particular examples, servers 112a and 112b may execute applications such as enterprise resource planning (ERP), manufacturing execution system (MES), or any other or additional plant or process control applications. Each of servers 112a and 112b includes any hardware, software, firmware, or combination thereof for controlling the overall operation of system 100.

As shown in FIG. 1, system 100 includes various redundant networks 114a and 114b and single networks 116a and 116b that support communication between components in system 100. Each of networks 114a and 114b and networks 116a and 116b represents any suitable network or combination of networks facilitating communication between components in system 100. For example, each of networks 114a, 114b, 116a and 116b may represent an Ethernet network. Process control system 100 may have any other suitable network topology according to particular needs.

Although FIG. 1 illustrates one example of process control system 100, various changes may be made to FIG. 1. For example, an alternative control system may include any number of process elements, controllers, servers, and operator stations.

FIG. 2 illustrates process element 102, which is controlled by external controller 104 according to an exemplary embodiment of the disclosure. Process element 102 comprises exemplary mixing vessel 210, temperature 230, and flow valves 240 and 250. Mixing vessel 210 holds fluid 220, which contains a catalytic material, among other materials. Although fluid 220 has been selected to demonstrate the operation of the present invention, this is by way of example only and should not be construed to limit the scope of the claims of the present invention. Those skilled in the art will readily understand that the present disclosure applies to gases as well as fluid and that, in an alternate embodiment of the present invention, mixing vessel 210 may hold gas 220, instead.

The reaction process occurring in mixing vessel 220 may be an endothermic or exothermic chemical reaction. To properly control the chemical reaction, controller 104 requires an accurate temperature profile of the fluidized bed of catalytic material in mixing vessel 210. In response to the temperature profile, controller 104 may control the temperature of the fluidized bed of catalytic material and fluid 220 by, among other things, regulating the input flow of material into mixing vessel 210 and regulating the output flow of material from mixing vessel 210. Controller 104 regulates the input flow rate via input valve 240 and regulates the output flow rate via output valve 250.

Controller 104 comprises central processing unit (CPU) 260 and radio frequency (RF) transceiver 270. According to the principles of the present disclosure, RF transceiver 270 wirelessly communicates with temperature sensor 230 according to any conventional radio protocol, including, for example, an IEEE-802.11 standard protocol, a Bluetooth standard protocol, an ISA100 standard protocol, and/or other radio protocols. Temperature sensor 230 may be placed at any advantageous position within mixing vessel 210, without concern to wiring. Thus, temperature sensor 230 may be positioned to obtain the most accurate temperature reading feasible. During operation, temperature sensor 230 transmits to RF transceiver 270 the recorded temperature readings at predetermined intervals of time and CPU 260 records the temperature profile in order to control valves 240 and 250 and regulate the temperature of fluid 220. Since temperature sensor 230 also contains a transceiver, two-way communications are possible and temperature sensor 230 may record one or more temperature readings in response to a command message from CPU 260.

FIG. 3 illustrates wireless temperature sensor 230 for monitoring the temperature profile in mixing vessel 210 according to an exemplary embodiment of the disclosure. Temperature sensor 230 comprises controller 310, RF transceiver 320, and temperature reader 330, which are housed in interior space 360 of casing 350. Temperature sensor 230 further comprises temperature probe 340, which is mounted on, or embedded in, the outer surface of casing 350. Temperature sensor 230 further comprises an internal battery (not shown), which provides power to controller 310, RF transceiver 320, and temperature reader 330.

Casing 350 is a relatively thick-walled device, made from insulation material 355, which shields the internal components of temperature sensor 230 from the extremes of temperature in fluid 220. In an advantageous embodiment, casing 350 may be a double-walled device, wherein the space between the interior insulation wall and the exterior insulation wall is a vacuum, thereby providing additional insulation properties. Furthermore, in one embodiment, interior space 360 may also contain vacuum that provides insulation for controller 310, RF transceiver 320, and temperature reader 330. In still another embodiment, interior space may be filled with a coolant liquid prior to use to further protect controller 310, RF transceiver 320, and temperature reader 330.

Temperature probe 340 contacts fluid 220 and generates an electrical signal according to the temperature of fluid 220. Temperature probe 340 is electrically coupled to temperature reader 330, which monitors the electrical signal generated by temperature probe 340 and determines the temperature of fluid 220. Controller 310 receives the recorded temperature readings from temperature reader 330 and forwards the recorded temperature readings to RF transceiver 320. RF transceiver 320 then communicates with RF transceiver 270 and transfers the recorded temperature readings to controller 104, as described above in FIG. 2.

Wireless temperature sensor 230 enables controller 104 to build an accurate temperature profile of fluid 220 and the fluidized bed of catalyst that may exist in mixing vessel 210. The positioning of wireless temperature sensor 230 near the catalyst enables wireless temperature sensor 230 to record the actual temperature of the catalytic reaction, rather than the temperature on the surface of fluid 220 or near the outer perimeter of mixing vessel 210. This is particularly advantageous for enabling controller 104 to regulate strongly exothermic or endothermic reactions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in monitoring a temperature of a fluid or gas in a mixing vessel, a wireless temperature sensor comprising:
   a temperature probe configured to contact the fluid or gas and generate a signal according to the temperature of the fluid or gas;
   a temperature reader configured to receive the signal generated by the temperature probe and determine therefrom a temperature reading of the fluid or gas;
   a radio frequency (RF) transceiver configured to transmit the temperature reading determined by the temperature reader to a control apparatus external to the mixing vessel; and
   a casing comprising a double-walled structure having an insulating interior wall and an insulating exterior wall, wherein the temperature reader and the RF transceiver reside in an interior space within the interior wall, and wherein the temperature probe is mounted on or embedded in the exterior wall.

2. The wireless temperature sensor as set forth in claim 1, wherein the RF transceiver is configured to transmit temperature readings to the control apparatus at predetermined times.

3. The wireless temperature sensor as set forth in claim 1, wherein the RF transceiver is configured to transmit the temperature reading to the control apparatus in response to a request message received from the control apparatus.

4. The wireless temperature sensor as set forth in claim 1, wherein the RF transceiver is configured to communicate with the control apparatus according to an ISA100 standard protocol.

5. The wireless temperature sensor as set forth in claim 1, wherein the RF transceiver is configured to communicate with the control apparatus according to an IEEE-802.11 standard protocol.

6. The apparatus as set forth in claim 1, wherein a space between the interior wall and the exterior wall comprises a vacuum.

7. The apparatus as set forth in claim 6, wherein the interior space further comprises a vacuum.

8. The apparatus as set forth in claim 6, wherein the interior space further comprises a cooling liquid.

9. A process control system comprising:
   a mixing vessel configured to hold a fluid or gas undergoing one of an exothermic reaction and an endothermic reaction;
   a controller configured to regulate a temperature of the fluid or gas in the mixing vessel, the controller comprising a first radio frequency (RF) transceiver; and
   a wireless temperature sensor configured to monitor the temperature of the fluid or gas in the mixing vessel, the temperature sensor comprising:
      a temperature probe configured to contact the fluid or gas and generate a signal according to the temperature of the fluid or gas;
      a temperature reader configured to receive the signal generated by the temperature probe and determine therefrom a temperature reading of the fluid or gas;
      a second RF transceiver configured to transmit the temperature reading determined by the temperature reader to the first RF receiver; and
      a casing comprising a double-walled structure having an insulating interior wall and an insulating exterior wall, wherein the temperature reader and the second RF transceiver reside in an interior space within the interior wall, and wherein the temperature probe is mounted on or embedded in the exterior wall.

10. The process control system as set forth in claim 9, wherein the second RF transceiver is configured to transmit temperature readings to the controller at predetermined times.

11. The process control system as set forth in claim 9, wherein the second RF transceiver is configured to transmit the temperature reading to the controller in response to a request message received from the controller.

12. The process control system as set forth in claim 9, wherein the first and second RF transceivers are configured to communicate according to an ISA 100 standard protocol.

13. The process control system as set forth in claim 9, wherein the first and second RF transceivers are configured to communicate according to an IEEE-802.11 standard protocol.

14. The process control system as set forth in claim 9, wherein a space between the interior wall and the exterior wall comprises a vacuum.

15. The process control system as set forth in claim 14, wherein the interior space further comprises a vacuum.

16. The process control system as set forth in claim 14, wherein the interior space further comprises a cooling liquid.

17. A method comprising:

placing a wireless temperature sensor in a mixing vessel, the wireless temperature sensor comprising a temperature probe, a temperature reader, a radio frequency (RF) transceiver, and a casing comprising a double-walled structure having an insulating interior wall and an insulating exterior wall, wherein the temperature reader and the RF transceiver reside in an interior space within the interior wall, and wherein the temperature probe is mounted on or embedded in the exterior wall;

contacting the temperature probe to a fluid or gas in the mixing vessel and generating a signal according to a temperature of the fluid or gas using the temperature probe;

receiving the signal generated by the temperature probe and determining therefrom a temperature reading of the fluid or gas at the temperature reader; and transmitting the temperature reading determined by the temperature reader to a destination outside of the mixing vessel using the RF transceiver.

18. The method as set forth in claim 17, further comprising:

transmitting temperature readings to the destination at predetermined times.

19. The method as set forth in claim 17, wherein transmitting the temperature reading comprises transmitting the temperature reading in response to a request message received from the destination.

20. The method as set forth in claim 17, further comprising:

insulating the temperature reader and the RF transceiver from heat in the mixing vessel using a vacuum within a space between the interior wall and the exterior wall and one of: a vacuum within the interior space and a cooling liquid within the interior space.

\* \* \* \* \*